(12) United States Patent
Bauer et al.

(10) Patent No.: US 12,523,604 B2
(45) Date of Patent: Jan. 13, 2026

(54) METHOD FOR THE NON-DESTRUCTIVE TESTING OF A STATOR WINDING INSULATION

(71) Applicants: Siemens Energy Global GmbH & Co. KG, Bayern (DE); Fraunhofer-Gesellschaft zur Förderung der angewandten Forschung e.V., Munich (DE)

(72) Inventors: Maris Bauer, Kaiserslautern (DE); Fabian Friederich, Speyer (DE); Daniel Hansmann, Herten (DE); Joachim Jonuscheit, Grümstadt (DE); Stefan Krane, Essen (DE); Andrey Mashkin, Cologne (DE); Friedhelm Pohlmann, Essen (DE); Claus Rohr, Schwetzingen (DE)

(73) Assignees: Siemens Energy Global GmbH & Co. KG, Bayern (DE); Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 361 days.

(21) Appl. No.: 18/020,931

(22) PCT Filed: Jul. 23, 2021

(86) PCT No.: PCT/EP2021/070654
§ 371 (c)(1),
(2) Date: Feb. 11, 2023

(87) PCT Pub. No.: WO2022/037896
PCT Pub. Date: Feb. 24, 2022

(65) Prior Publication Data
US 2024/0053263 A1   Feb. 15, 2024

(30) Foreign Application Priority Data
Aug. 21, 2020   (DE) .............. 10 2020 210 658.4

(51) Int. Cl.
*G01N 23/00* (2006.01)
*G01N 21/3581* (2014.01)
*G01N 21/95* (2006.01)

(52) U.S. Cl.
CPC ..... *G01N 21/3581* (2013.01); *G01N 21/9515* (2013.01); *G01N 2021/9518* (2013.01)

(58) Field of Classification Search
CPC ........... G01N 21/3581; G01N 21/9515; G01N 2021/9518
See application file for complete search history.

(56) References Cited

U.S. PATENT DOCUMENTS

2015/0212060 A1   7/2015   Van Mechelen
2017/0336323 A1   11/2017   Mann
(Continued)

FOREIGN PATENT DOCUMENTS

CN   105593692 A   5/2016
CN   106525862 A   3/2017
(Continued)

OTHER PUBLICATIONS

PCT International Search Report and Written Opinion of International Searching Authority mailed Nov. 12, 2021 corresponding to PCT International Application No. PCT/EP2021/070654 filed Jul. 23, 2021.
(Continued)

*Primary Examiner* — Dani Fox
(74) *Attorney, Agent, or Firm* — Wolter Van Dyke Davis, PLLC (57) ABSTRACT

A method and testing device for the non-destructive testing of at least partial regions of an insulation of a stator winding
(Continued)

of an electric machine, in particular a generator of a high-voltage motor, wherein the non-destructive testing is carried out in situ at the installation site of the electric machine using terahertz measurement technology.

23 Claims, 5 Drawing Sheets

(56) References Cited

U.S. PATENT DOCUMENTS

| | | |
|---|---|---|
| 2021/0190478 A1 | 6/2021 | Van Mechelen |
| 2022/0146579 A1 | 5/2022 | Mashkin |

FOREIGN PATENT DOCUMENTS

| | | |
|---|---|---|
| CN | 111175621 A | 5/2020 |
| DE | 102015203547 A1 | 9/2016 |
| DE | 102017000657 A1 | 7/2017 |
| EP | 2899499 A1 | 7/2015 |
| WO | 2020038573 A1 | 2/2020 |
| WO | 2020169286 A1 | 8/2020 |

OTHER PUBLICATIONS

Ellrich F. et al: "Terahertz Quality Inspection for Automotive and Aviation Industries"; Journal Of Infrared, Millimeter And Terahertz Waves, Springer New York LLC, US; vol. 41, No. 4, 26. (Nov. 26, 2019), pp. 470-489, XP037106915.

Cimino, Alessandro et al: "Causes Of Cyclic Mechanical Aging And Its Detection In Stator Winding Insulation Systems"; IEEE Electrical Insulation Magazine; vol. 35; No. 3; May/Jun. 2019; pp. 32-40; Doi: 10.1109/MEI.2019.8689434.; 2019.

Ohki, Yoshimichi et al: Terahertz Spectroscopy As A Novel Method For Diagnosing The Integrity Of Polymer Insulated Cables; 2012 Annual Report Conference on Electrical Insulation and Dielectric Phenomena; Montreal, QC, Canada; 2012; pp. 203-206; doi: 10.1109/CEIDP.2012.6378756; 2012.

Cheng, L. et al: "Research Of Nondestructive Methods To Test Defects Hidden Within Composite Insulators Based On Thz Time-Domain Spectroscopy Technology"; IEEE Transactions on Dielectrics and Electrical Insulation; vol. 23; No. 4; Aug. 2016; pp. 2126-2133; DOI: 10.1109/TDEI.2016.005505; 2016.

Frauenhofer: "Mobile Handheld Scanner For Non-Destructive Terahertz Testing"; 23. (Feb. 23, 2019), XP055857319; Internet:URL: https://www.vision.fraunhofer.de/de/technologien-anwendungen/technologien/terahertz/mobiler-handscanner-zerstoerungsfreie-terahertz-pruefung.html; with English machine translation.

Cimino, Alessandro et al: "Analysis Of Fault Detection In The Electrical Insulation System Of Rotating Machines"; 2018 International Conference on Diagnostics in Electrical Engineering (Diagnostika); Sep. 4-7, 2018; IEEE; pp. 1-4, XP033441850; 2018.

Duling, IRL et al: "Revealing hidden defects"; Nature Photonics; (Nov. 1, 2009), pp. 630-632, XP055523487.

METHOD FOR THE NON-DESTRUCTIVE TESTING OF A STATOR WINDING INSULATION

CROSS REFERENCE TO RELATED APPLICATIONS

This application is the US National Stage of International Application No. PCT/EP2021/070654 filed 23 Jul. 2021, and claims the benefit thereof. The International Application claims the benefit of German Application No. DE 10 2020 210 658.4 filed 21 Aug. 2020. All of the applications are incorporated by reference herein in their entirety.

FIELD OF INVENTION

The present invention relates to a method for the non-destructive testing of at least partial regions of an insulation of a stator winding of an electric machine, in particular a generator or a high-voltage motor.

BACKGROUND OF INVENTION

The winding bars of the stator winding of generators, such as those of turbine-driven and hydro-electric generators, for example, are provided with an insulation. This insulation normally comprises a plurality of winding layers made of an insulating tape which are wound over one another and are wound around the winding bars in an overlapping manner. The insulating tape layers are impregnated with a resin which was hardened after the layers were wound. In terms of shaping, the winding bars each comprise a straight section, most of which is inserted in the grooves in the stator or stator laminated core, and two involutedly curved sections, which are connected to the two free ends of the straight section and protrude outwardly from the grooves in the stator. Since the stator lamination is earthed, the insulation in the groove region contains an electrically weakly conductive outer layer, the so-called coil-side corona shielding, in order to control the distribution of potential in the insulation. In the edge region of the straight section, the coil-side corona shielding is extended outside of the grooves by a weakly conductive overhang corona shielding in order that the electrical potentials on the bar surface are gradually controlled and the electric field inside the insulation is increasingly reduced.

During the operation of the generator, a structural change in the stator winding insulation occurs, caused by electrical, thermal, mechanical and chemical stresses. The consequence is accelerated ageing phenomena in the insulation that lead to damage in the longer term, for example in the form of microcracks or delaminations. In order to avoid damage to the generator, it is necessary to identify such ageing phenomena and the extent thereof early and to eliminate said ageing phenomena in a timely manner where appropriate. Against this background, stator winding insulations are tested at regular intervals of time and are repaired as required.

Currently, ageing phenomena in a stator winding insulation are detected, for example, using so-called partial-discharge measurement. However, this proven method, which is generally considered to be an integral measurement, can only cover those partial regions of a stator winding insulation in which the electric field is strong enough, that is to say those partial regions in which the winding bars are arranged within the stator grooves, and the partial regions beneath the respective overhang corona protection, which comprise about 30% of the front insulation length. Ageing phenomena also occur in the remaining regions of the winding bars, however, and so complete detection of the ageing phenomena in a stator winding insulation is not possible using partial-discharge measurement alone. In addition, it is not possible to locate detected ageing phenomena to the required degree using partial-discharge measurement since the accuracy of the delay time measurement for the partial-discharge pulses is about 1.2 m.

A further known possibility for detecting ageing phenomena in a stator winding insulation is high-voltage testing, but in the presence of significant ageing phenomena this testing can lead to a breakdown which is no longer repairable, which is why this testing is only rarely used.

Furthermore, it is possible to detect surface-level defects in or damage to the insulation using an endoscope or mirror. Deeper-lying flaws cannot be captured using these methods, however, and accordingly remain unidentified.

SUMMARY OF INVENTION

Starting from this prior art, an object of the present invention is to provide an alternative method for the non-destructive testing of at least partial regions of an insulation of a stator winding of an electric machine.

To achieve this object, the present invention provides a method of the type mentioned at the outset which is characterized in that the non-destructive testing is carried out in situ at the installation site of the electric machine using terahertz measurement technology.

Terahertz measurement technology is based on electromagnetic waves in the frequency range of 0.1 to 10 terahertz at wavelengths of 3 mm to 30 μm. Due to low photon energy, terahertz radiation can penetrate non-conductive materials and at the same time, due to its short wavelengths, affords spatial accuracy with which the flaws can be resolved in terahertz images and are therefore able to be accurately located. Moreover, terahertz technology allows a depth-related analysis and can detect defects lying at a corresponding depth in the insulation. Since the radiation is non-ionizing and therefore harmless for biological matter, no special protective measures are required, which is why the technology is well suited to use in industrial environments. Courtesy of the inventive on-site testing and diagnosis of the state of the insulation, repair measures can be taken immediately in the event of defects that are present being detected. In this way, the risk of an unexpected failure of the applicable electric machine during operation can be significantly reduced, as a result of which the costs associated with such a failure can be avoided. Since using terahertz technology makes it possible to make accurate statements about the type, the extent and the position of defects that are present in the insulation, the evolution of detected defects which, due to the small extent, are not remedied straight away can be monitored and recorded. Accordingly, it is possible to make relatively reliable predictions about the impact of different defects on the service life of the insulation, which is becoming increasingly important in particular against the background that the operation of generators has changed significantly due to the constantly increasing proportion of renewable energies, which is why previous empirical values can be relied on only to a limited extent. The test data and findings obtained using terahertz technology can also be used for future designs of insulations.

According to one configuration of the method according to the invention, the non-destructive testing is carried out on those partial regions of the insulation which are accessible from the outside, in particular exclusively on partial regions of the insulation which are accessible from the outside. This relates especially to those partial regions of the insulation which surround involutely curved sections of the stator winding, or of the winding bars, that protrude outwardly from grooves in the stator. Testing using partial-discharge measurement is unsuitable for such partial regions, as was already explained at the outset, since the electric field in these partial regions is not strong enough.

Advantageously, the non-destructive testing is carried out using a terahertz sensor, which is moved along the surfaces of partial regions of the insulation that are to be tested and carries out measurements at different measurement positions.

The sensor signals emitted by the terahertz sensor are preferably introduced at predetermined angles into the surfaces of partial regions of the insulation that are to be tested, wherein the predetermined angles are advantageously 90°. Due to the tight space available for positioning the terahertz sensor, at certain measurement positions it is entirely possible that the preferred angle of 90° is not easy to keep to and is varied as appropriate.

According to one configuration of the present invention, the signals received by the terahertz sensor in response to the emitted signals are stored together with the respective position and orientation of the terahertz sensor at the time at which the signals are emitted, based on a predetermined coordinate system. In this way, detected defects in the insulation can be accurately located based on the coordinate system.

Preferably, the surfaces of partial regions of the insulation that are to be tested are scanned using the terahertz sensor and individual two-dimensional sectional planes or sectional images through the insulation are generated by recording complete depth information relating to the insulation, so-called depth sweeps, at individual measurement points in each case, wherein the depth information in the terahertz measurement is obtained in particular by way of the frequency-modulated continuous wave (FMCW) radar method. Here, the difference in frequency between an emitted frequency ramp and a frequency ramp reflected by the insulation is detected in the receiver path of the measurement system by means of frequency mixing. Delay time information or depth information relating to the individual reflecting layers of the insulation is generated from the frequency data thus captured.

Advantageously, quasi-3D images of the partial regions of the insulation that are to be tested are generated based on the generated two-dimensional sectional planes or sectional images.

According to one configuration of the present invention, the terahertz sensor is moved in an automated manner using an electromechanical displacement unit, in particular in the form of a buckling arm robot holding the terahertz sensor, as a result of which very accurate, flexible and reproducible guidance of the terahertz sensor is facilitated while the non-destructive testing is being carried out.

The electromechanical displacement unit can be arranged on the rotor of the electric machine and can be moved on said rotor. In order to move the electromechanical displacement unit on the rotor, the displacement unit can have a driven drive unit, which is provided with wheels, for example. The drive unit can be provided with magnets on the bottom in order to be able to also move said drive unit overhead on the rotor.

Alternatively, it is possible to attach the electromechanical displacement unit to the stator of the electric machine at a first position and to detach it after a number of measurements have been carried out, and to attach it to the stator of the electric machine at a second position, different from the first position, in order to carry out further measurements. Compared with the first-mentioned variant, this variant has the disadvantage that the displacement unit has to be manually repositioned several times. The advantage, however, is that, due to the fact that no drive is required, the design of the electromechanical displacement unit is less complex and therefore less expensive to produce.

The present invention further provides a testing device designed for carrying out the method according to the invention, comprising an electromechanical displacement unit and a terahertz sensor arranged thereon.

The electromechanical displacement unit is advantageously a buckling arm robot.

According to a first variant, the electromechanical displacement unit is designed to be arranged on a rotor of an electric machine and to be moved on said rotor in a motor-driven manner.

Alternatively, the electromechanical displacement unit is designed to be attached to a stator of an electric machine at a first position and detached after a number of measurements have been carried out, and to be attached to the stator of the electric machine at a second position, different from the first position, in order to carry out further measurements.

Preferably, the terahertz sensor has at least one dielectric measurement tip, which is angled in particular in the region of its free end in order to make allowance for the tight space available for positioning the terahertz sensor while the method according to the invention is being carried out. The at least one measurement tip can be surrounded by a rigid sheathing in order to prevent the measurement tip from becoming damaged and/or bent.

Alternatively, the terahertz sensor can have a quasi-optical free-beam system designed to direct the terahertz radiation onto the measurement position. The quasi-optical free-beam system can be realized in the form of miniaturized mirror optics, for example.

BRIEF DESCRIPTION OF THE DRAWINGS

Further features and advantages of the present invention will become apparent on the basis of the following description with reference to the accompanying drawing, in which.

DETAILED DESCRIPTION OF INVENTION

Figure 1:
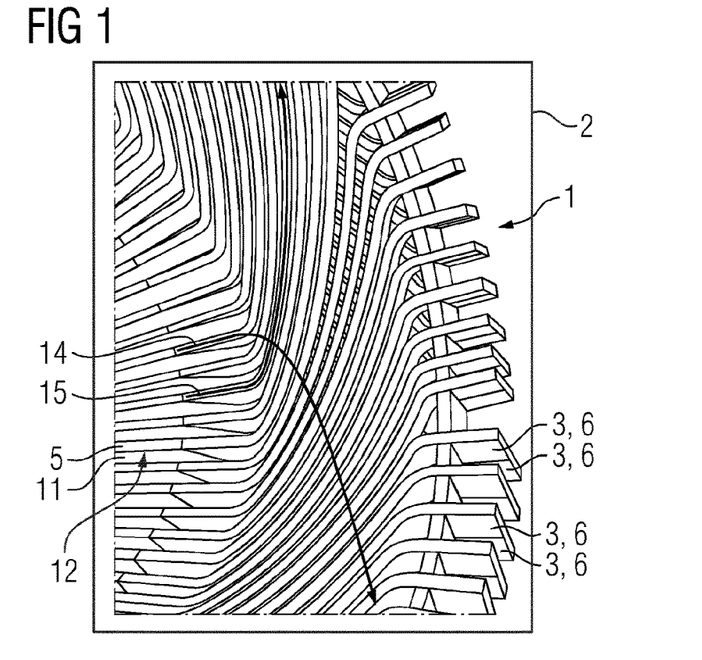
FIG. 1 is a perspective, schematic partial view of a stator winding of an electric machine, in the present case in the form of a generator.
Figure 2:
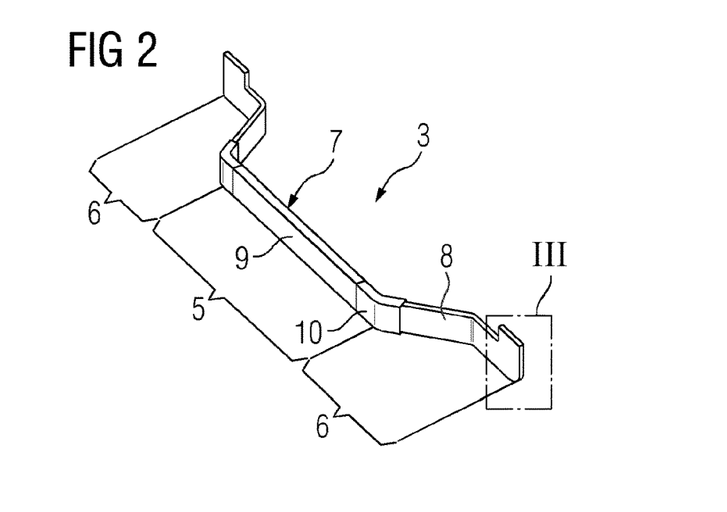
FIG. 2 is a schematic, perspective view of an individual stator bar of the stator winding illustrated in FIG. 1.
Figure 3:
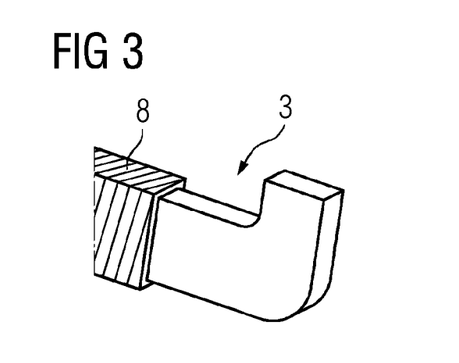
FIG. 3 is an enlarged view of the detail III in FIG. 2 showing an involutely curved section of the stator bar.
Figure 4:
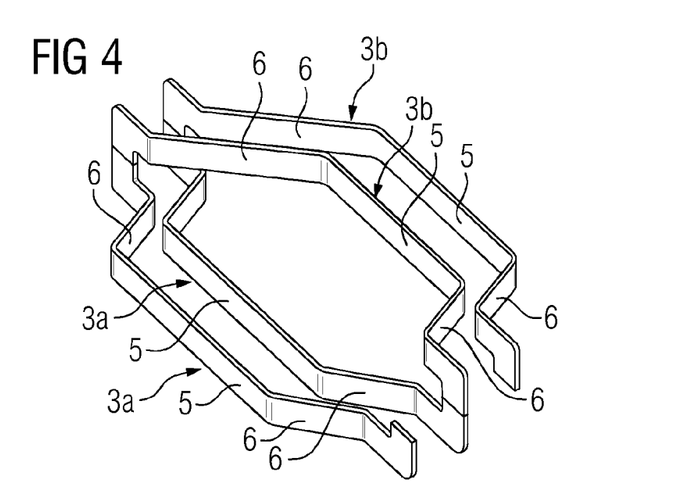
FIG. 4 is a schematic, perspective view of four winding bars of the stator winding illustrated in FIG. 1.
Figure 5:
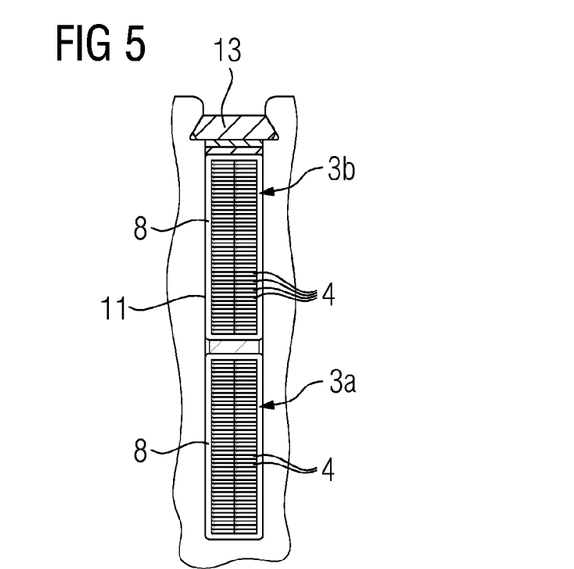
FIG. 5 is a sectional view showing an upper winding bar and a lower winding bar, which are arranged in a common groove in the stator of the stator winding shown in FIG. 1.

FIGS. 1 to 5 show parts of a stator winding 1 of an electric machine 2, which in the present case is a generator, for example a turbine-driven or hydro-electric generator. The stator winding 1 comprises a multiplicity of winding bars 3. With reference to FIGS. 2 and 3, each winding bar 3 is produced from a plurality of firmly consolidated conductor strands 4 and has a central, straight section and two involutely curved sections 6 connected to both sides of the straight section 5. Each winding bar 3 is covered with an insulation 7. The insulation 7 comprises a base insulation 8 which completely covers the straight section 5 and the curved sections 6. In the present case, the base insulation 8 consists of insulating tape wound around the winding bar 3 in a plurality of layers in an overlapping manner. The insulating tape is impregnated with resin which was hardened after the layers were wound. The insulation 7 further comprises a coil-side corona shielding 9, which covers the straight section 5 but not the curved sections 6, and an overhang corona shielding 10 in the transition regions between the straight section 5 and the curved sections 6. In the present case, both the coil-side corona shielding 9 and the overhang corona shielding 10 are made from a conductive tape.

As is illustrated in FIG. 1, the straight sections 5 of the winding bars 3 are inserted in grooves 11 formed in an annular stator 12 of the electric machine 2. In the present case, two winding bars 3 are arranged radially one on top of the other in each individual groove 11, namely a lower winding bar 3a first and then an upper winding bar 3b, which are fixed in the associated groove 11 using a wedge-shaped piece 13. The curved sections 6 of the lower winding bars 3a are oriented such that they cross the curved sections 6 of the upper winding bars 3b, as is indicated by the arrows 14 and 15 in FIG. 1, wherein the curved sections 6 of the two free ends of each lower winding bar 3a are connected to the free ends of the curved sections 6 of the upper winding bars 3b, and vice versa. The connection is made via connecting elements, which are not illustrated in detail.

During the operation of the generator, a structural change in the insulation 7 occurs, caused by electrical, thermal, mechanical and/or chemical stresses. The consequence is accelerated ageing phenomena in the insulation 7 that lead to damage in the longer term, for example in the form of microcracks, delaminations, flaws or the like. In order to avoid damage to the generator, it is accordingly necessary to identify such ageing phenomena and the extent thereof early and to eliminate said ageing phenomena in a timely manner where appropriate.

According to the invention, the proposal is to carry out non-destructive testing of the insulation 7 on the partial regions of the stator winding 1 which are accessible from the outside in situ at the installation site of the electric machine 2 using terahertz measurement technology. This firstly relates to those partial regions of the insulation 7 which surround the curved sections 6 of the winding bars 3, but also, where appropriate, to further partial regions of the insulation 7 which are accessible, for example, through cooling openings or the like.

Terahertz measurement technology is a technology which uses electromagnetic radiation in the terahertz range, that is to say in a frequency range of between 0.1 and 10 terahertz. Electromagnetic radiation in this frequency range can be used to penetrate matter which is impenetrable by visible and infrared light, especially non-metallic materials, and so damage to the insulation 7 is able to be detected. The wavelengths of the radiation lie in the range of 30 μm to 3 mm, and so good spatial resolution is also afforded. Accordingly, detected flaws can also be effectively located. The radiation is very low-energy, which is why it is not harmful to the health of humans.

Figure 6:
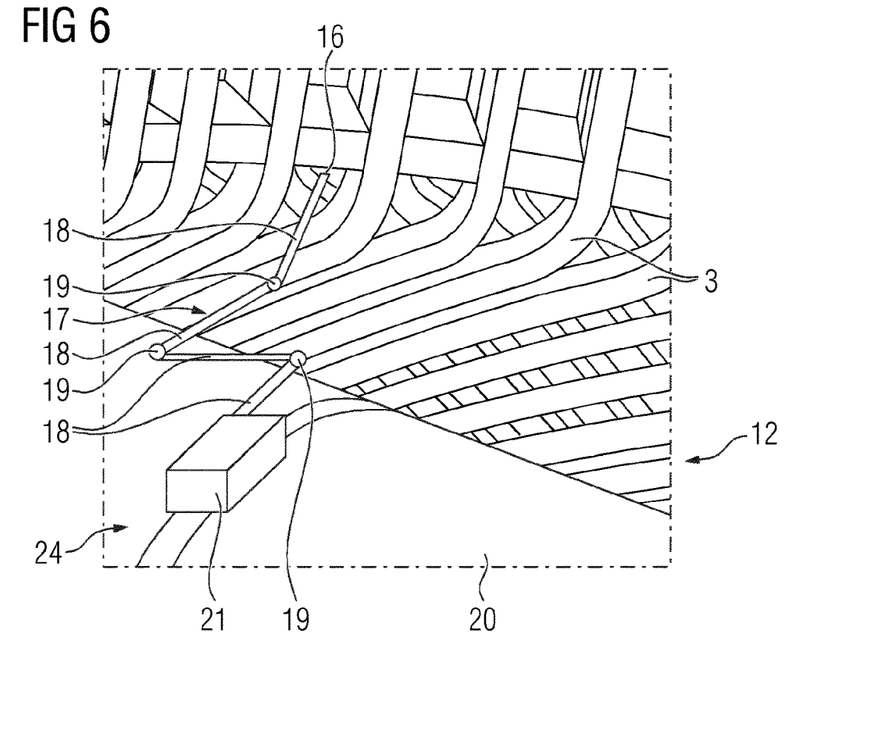
FIG. 6 is a perspective view showing a testing device according to a first embodiment of the present invention while a testing method according to the invention is being carried out.
Figure 7:
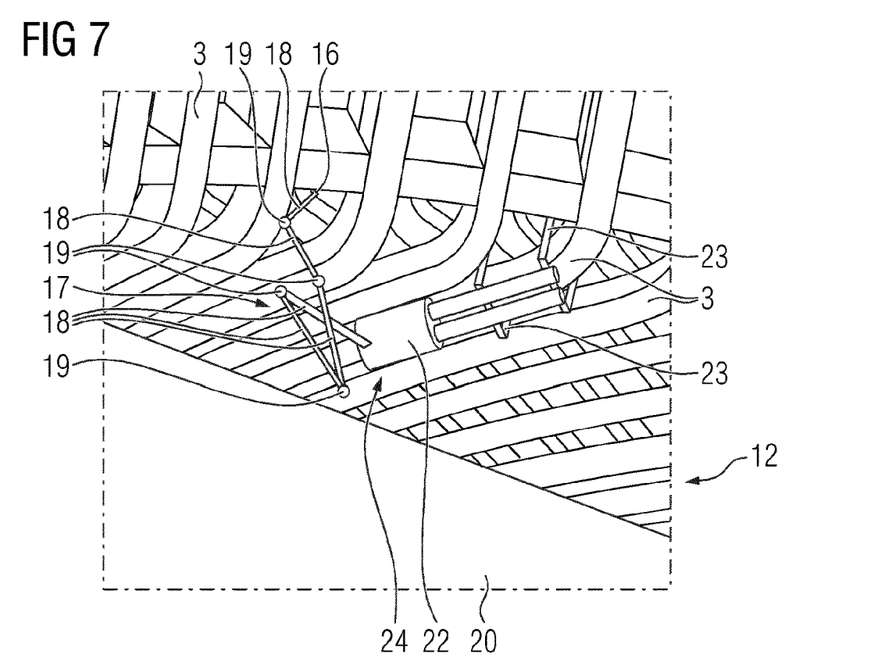
FIG. 7 is a perspective view showing a testing device according to a second embodiment of the present invention while a testing method according to the invention is being carried out.
Figure 8:
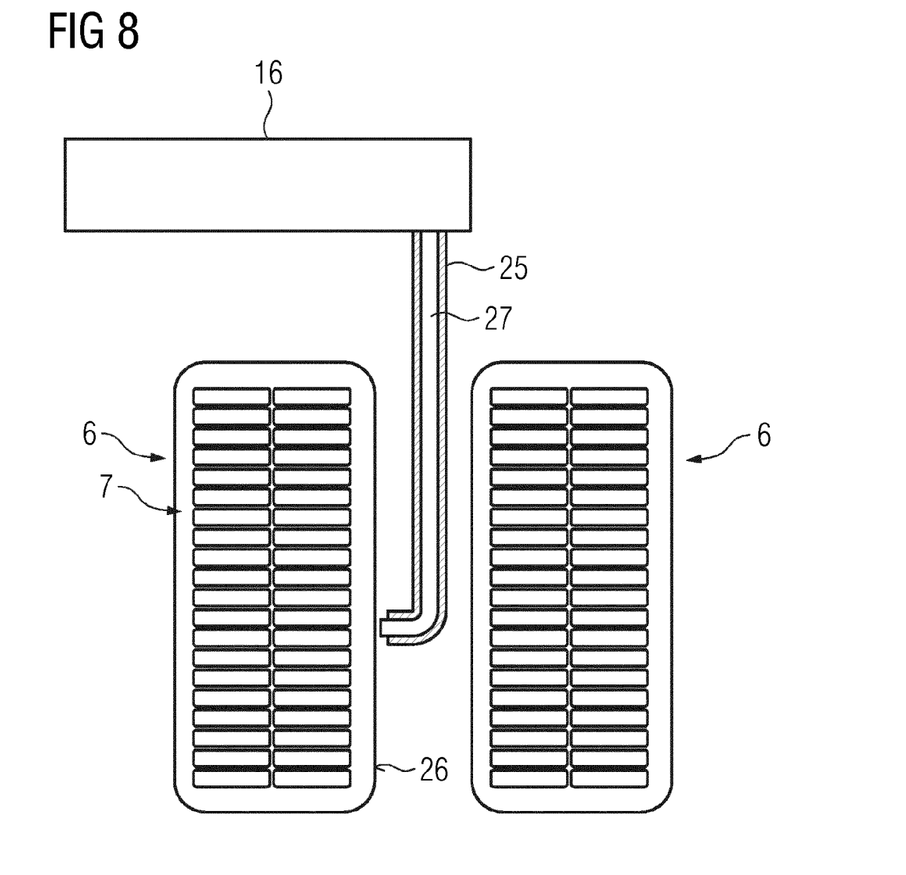
FIG. 8 is a schematic view showing a terahertz sensor 16, the measurement tip of which is interposed between two winding bars.

As is shown in FIGS. 6 to 8, a testing device 24 having a terahertz sensor 16 is used for carrying out the method in the present case, wherein the terahertz sensor 16 is moved along the surfaces of the partial regions of the insulation 7 that are to be tested and carries out measurements at different measurement positions. The sensor signals emitted by the terahertz sensor 16 in the form of electromagnetic radiation in the terahertz range are introduced at predetermined angles into the surfaces of the partial regions of the insulation 7 that are to be tested, which angles are preferably 90°. In order to make allowance for the tight installation space between the adjacent curved sections 6 of the winding bars 3 in combination with the preferred predetermined angles, the terahertz sensor 16 advantageously has, as is illustrated by way of example in FIG. 8, one or more dielectric measurement tips 25, which are angled in the region of their free end. The terahertz sensor 16 can accordingly be interposed between adjacently arranged curved sections 6 of the winding bars 3 in such a way that the free end of the measurement tip 25 is oriented perpendicular or at least virtually perpendicular to that surface 26 of the insulation 7 via which or along which the measurement tip is intended to be guided. In the present case, the measurement tip 25 is surrounded by a rigid sheathing 27 which protects the measurement tip 25 and prevents bending. Alternatively, instead of curved dielectric measurement tips, the terahertz sensor 16 can also have a miniaturized quasi-optical free-beam system designed to direct the emitted terahertz radiation onto the respective measurement positions in the range of the preferred predetermined angles.

In the present case, the terahertz sensor 16 is moved in an automated manner using an electromechanical displacement unit 17, which is configured in the form of a buckling arm robot holding the terahertz sensor 16, the arm members 18 of said robot being connected to one another via a multiplicity of articulations 19. The electromechanical displacement unit 17 can, as is shown in FIG. 6, be arranged on the rotor 20 of the electric machine 2 and be movable on said rotor. For this purpose, provision is made for a motorized drive unit 21, which is provided with wheels or the like. On the bottom, the drive unit 21 is provided with magnets, which are not illustrated in detail, in order to be also able to move said drive unit overhead on the rotor 20. Alternatively, as shown in FIG. 7, it is possible to attach the electromechanical displacement unit 17 to the stator 12 of the electric machine 2 at a first position and to detach it after a number of measurements have been carried out, and to attach it to the stator 12 at a second position, different from the first position, in order to carry out further measurements. For this purpose, the electromechanical displacement unit 17 has a base unit 22 which is provided with suitably designed attachment means 23 which allow the base unit 22 to be releasably attached to the stator 12.

The signals received by the terahertz sensor 16 in response to the emitted signals are then stored together with the respective position and orientation of the terahertz sensor 16, or its measurement tip(s) 25, at the time at which the signals are emitted, based on a predetermined coordinate system. For each measurement, a depth sweep of the insulation 7 is carried out in the direction of introduction of the emitted signals and a two-dimensional sectional plane of the insulation 7 is accordingly generated. The depth information is preferably obtained by way of the frequency-modulated continuous wave radar method in this case. Quasi-3D images of the tested partial regions of the insulation 7 can then be composed from a multiplicity of such sectional planes in the direction of movement of the terahertz sensor 16. The positions of defects contained in said insulation can then be readily located on the basis of the coordinate system.

Although the invention has been described and illustrated in more detail on the basis of preferred exemplary embodiments, the invention is not restricted by the examples disclosed and other variations may be derived therefrom by a person skilled in the art without departing from the protective scope of the invention.

The invention claimed is:

1. A method for a non-destructive testing of at least partial regions of an insulation of a stator winding of an electric machine, comprising:
    carrying out the non-destructive testing of the stator winding while the stator winding is fully assembled in situ at an installation site of the electric machine using terahertz measurement technology.
2. The method as claimed in claim 1,
    wherein the non-destructive testing is carried out on those partial regions of the insulation which are accessible from outside.
3. The method as claimed in claim 1,
    wherein the non-destructive testing is carried out using a terahertz sensor, which is moved along surfaces of partial regions of the insulation that are to be tested and carries out measurements at different measurement positions.
4. The method as claimed in claim 3,
    wherein sensor signals emitted by the terahertz sensor are introduced at predetermined angles into the surfaces of partial regions of the insulation that are to be tested.
5. The method as claimed in claim 4,
    wherein signals received by the terahertz sensor in response to the emitted sensor signals are stored together with the respective position and orientation of the terahertz sensor at a time at which the sensor signals are emitted, based on a predetermined coordinate system.
6. The method as claimed in claim 3,
    wherein the terahertz sensor is used to scan the surfaces of partial regions of the insulation that are to be tested and individual two-dimensional sectional planes or sectional images through the insulation are generated by recording complete depth information relating to the insulation at individual measurement points in each case.
7. The method as claimed in claim 6,
    wherein quasi-3D images of the partial regions of the insulation that are to be tested are generated based on generated two-dimensional sectional planes or sectional images.
8. The method as claimed in claim 3,
    wherein the terahertz sensor is moved in an automated manner using an electromechanical displacement unit.
9. The method as claimed in claim 8,
    wherein the electromechanical displacement unit is arranged on a rotor of the electric machine and is moved on said rotor.
10. The method as claimed in claim 8,
    wherein the electromechanical displacement unit is attached to the stator of the electric machine at a first position and detached after a number of measurements have been carried out, and is attached to the stator of the electric machine at a second position, different from the first position, in order to carry out further measurements.
11. A testing device designed for carrying out a method as claimed in claim 1, comprising
    an electromechanical displacement unit and a terahertz sensor arranged thereon.
12. The testing device as claimed in claim 11,
    wherein the electromechanical displacement unit is a buckling arm robot.
13. The testing device as claimed in claim 11,
    wherein the electromechanical displacement unit is designed to be arranged on a stator of an electric machine, and to be moved on said stator in a motor-driven manner.
14. The testing device as claimed in claim 11,
    wherein the electromechanical displacement unit is designed to be attached to a stator of an electric machine, at a first position and detached after a number of measurements have been carried out, and to be attached to the stator of the electric machine at a second position, different from the first position, in order to carry out further measurements.
15. The testing device as claimed in claim 11,
    wherein the terahertz sensor has at least one dielectric measurement tip,
    wherein the at least one dielectric measurement tip comprises a 90-degree bend at its free end,
    and wherein the free end is configured to fit between adjacent bars of the stator winding.
16. The testing device as claimed in claim 11,
    wherein the terahertz sensor has a quasi-optical free-beam system designed to direct terahertz radiation onto a measurement position.
17. The method as claimed in claim 1,
    wherein the electric machine comprises a generator or a high-voltage motor.
18. The method as claimed in claim 2,
    wherein the partial regions of the insulation comprise those which surround involutely curved sections of the stator winding that protrude outwardly from grooves in the stator.
19. The method as claimed in claim 4,
    wherein the predetermined angles are 90°.
20. The method as claimed in claim 6,
    wherein the depth information in the terahertz measurement is obtained by way of frequency-modulated continuous wave radar method.
21. The method as claimed in claim 8,
    wherein the electromechanical displacement unit comprises a buckling arm robot holding the terahertz sensor.
22. The testing device as claimed in claim 13,
    wherein the electric machine comprises a generator or a high-voltage motor.
23. The testing device as claimed in claim 14,
    wherein the electric machine comprises a generator or a high-voltage motor.

* * * * *